March 12, 1963
H. PAITCHELL ET AL
3,080,831
APPARATUS FOR AUTOMATICALLY FORMING DOUGH
RINGS FOR MAKING BAGELS
Filed Jan. 24, 1961
3 Sheets-Sheet 1
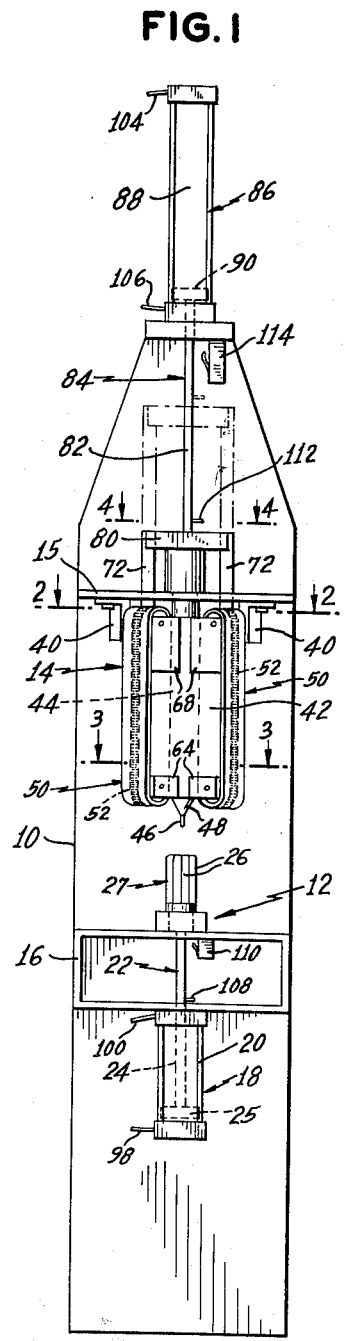
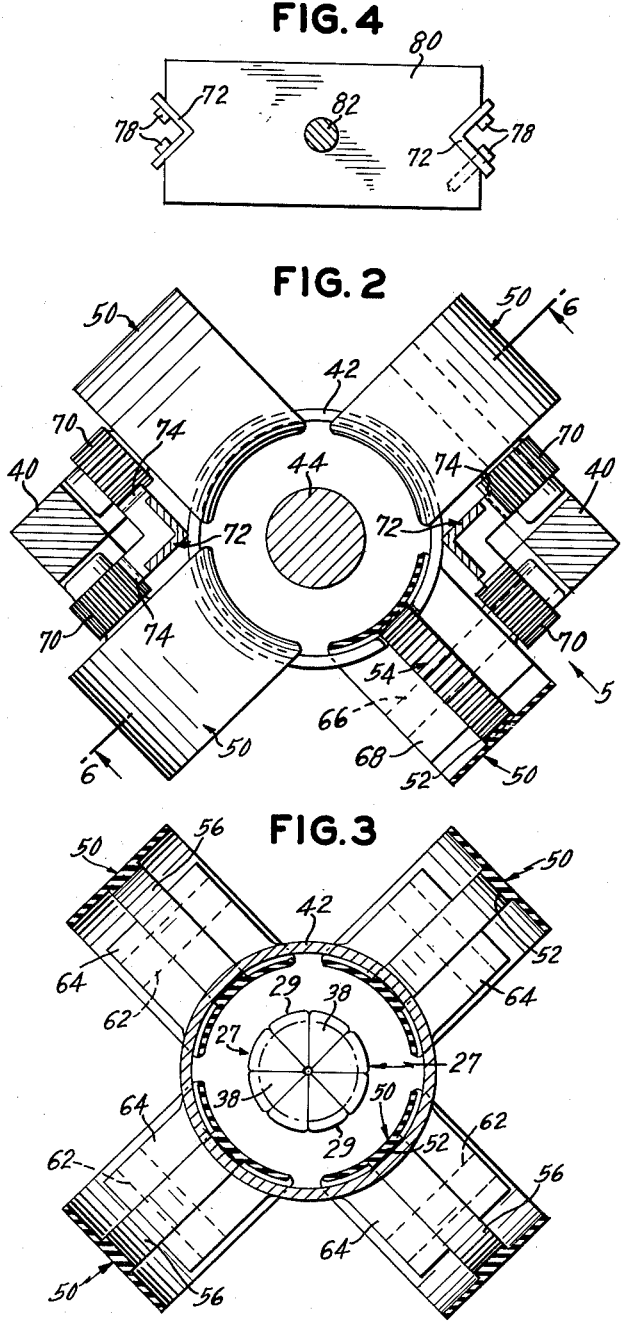
INVENTORS
HAROLD PAITCHELL &
IRVING GOLDBERG
BY
Edwin Levisohn
ATTORNEY March 12, 1963

H. PAITCHELL ET AL 3,080,831

APPARATUS FOR AUTOMATICALLY FORMING DOUGH RINGS FOR MAKING BAGELS

Filed Jan. 24, 1961

INVENTOR.
HAROLD PAITCHELL &
IRVING GOLDBERG
BY Edwin Levisohn
ATTORNEY

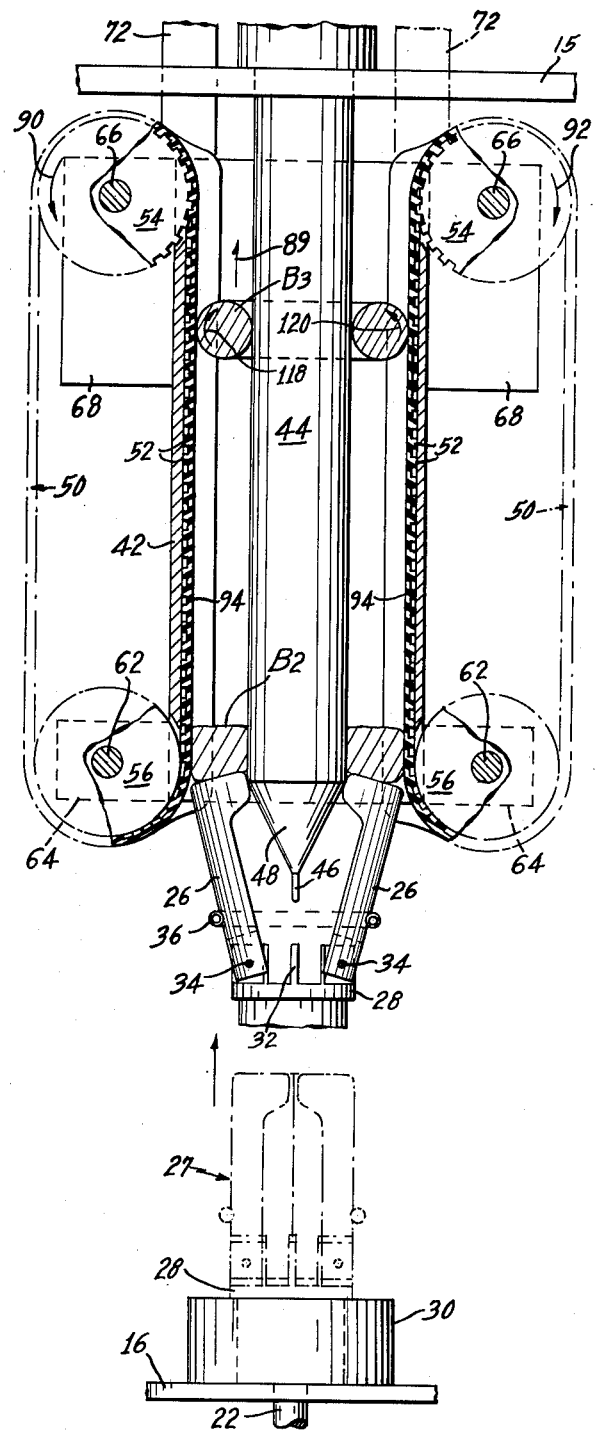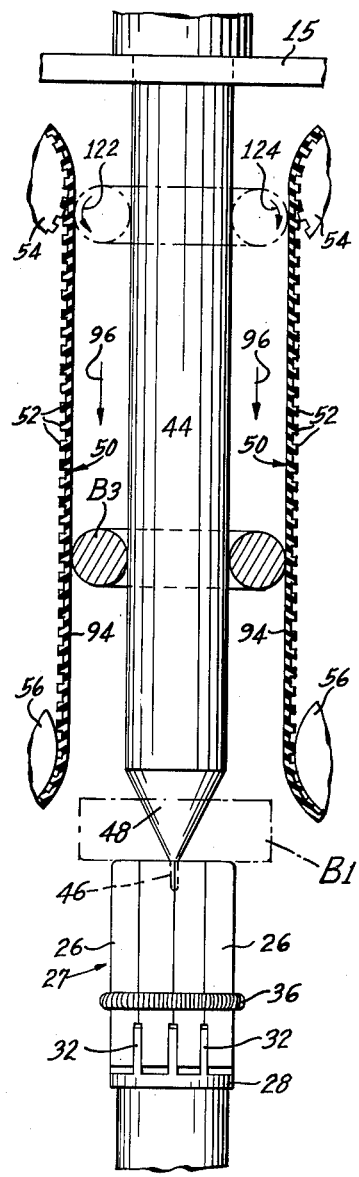

(C1. 107—8)

3,080,831
APPARATUS FOR AUTOMATICALLY FORMING
DOUGH RINGS FOR MAKING BAGELS
Harold Paitchell, Clifton, N.J., and Irving Goldberg,
Brooklyn, N.Y., assignors to Bagel Machines, Inc.,
Manhattan, N.Y., a corporation of New York
Filed Jan. 24, 1961, Ser. No. 84,595
11 Claims. (Cl. 107—8)

The present invention relates to an apparatus for automatically forming dough rings for making bagels.

As is well known, a bagel is similar in shape to a doughnut, being in the form of a ring having a circular cross section. A doughnut may be formed directly from the dough by stamping out a circular piece of dough from which the center is then stamped out. However, the bagel dough is comparatively stiff and does not lend itself to the same treatment as doughnut dough. U.S. Patent No. 2,666,398, issued January 19, 1954 to Louis Gendler et al., and assigned to the assignee hereof, shows an automatic machine for forming bagel-dough rings in which, after a piece of dough of predetermined size is separated from the batch of dough, it is shaped into a generally cylindrical form which, in turn, is shaped into the bagel ring. In the process of shaping the cylindrical piece of dough into the bagel ring, the cylindrical piece is bent into inverted U-shape and the end portions thereof are then forced or pressed against each other in order to fuse them together. However, it has been found that the pressed-together end portions tend to separate so that the resultant product does not retain the desired characteristics.

In view of the foregoing, it is an object of the present invention to obviate the disadvantages of the prior art.

It is another object of the present invention to provide an apparatus or machine which is operable to automatically produce a ring of bagel shape from a piece of bagel dough, which ring will not open or separate.

It is a further object of the present invention to provide a machine for automatically making bagel rings in which there is obviated the necessity for first forming a cylindrical piece of bagel dough and then pressing the end portions thereof together.

The above and other objects and advantages of the present invention will be fully understood from the following description considered in connection with the accompanying drawings which, however, are to be considered as illustrative of our invention but not in limitation thereof.

In the drawings which illustrate the best mode presently contemplated for carrying out the invention:

FIG. 1 is a view, in elevation, of a bagel-forming machine pursuant to the present invention;

FIG. 2 is a sectional view, on a larger scale, taken on line 2—2 of FIG. 1;

FIG. 3 is a sectional view, on a larger scale, taken on line 3—3 of FIG. 1;

FIG. 4 is a sectional view, on a larger scale, taken on line 4—4 of FIG. 1;

FIGS. 6 and 7 are views, on an enlarged scale and with portions removed and in section, taken on line 6—6 of FIG. 2, showing different operating positions of the machine;

Figure 8:
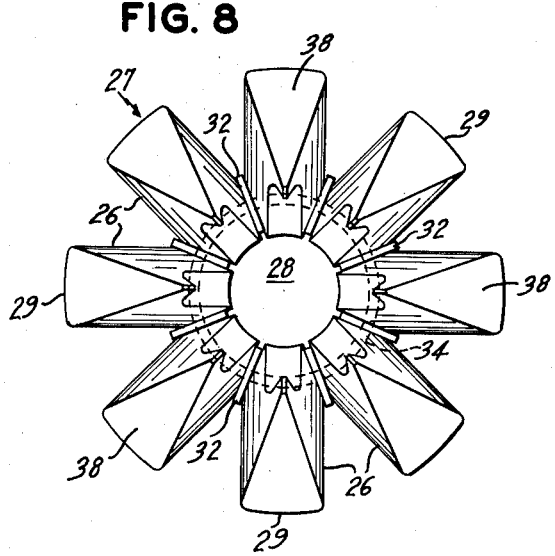
FIG. 8 is a plan view of a device utilized in the machine to advance a piece of bagel dough for the formation thereof into a bagel ring.

Briefly described, pursuant to the present invention, a piece of dough of predetermined size, which has been separated from a batch of bagel dough, is introduced into the machine. The piece of dough is first pierced to form a circular aperture which is enlarged to a predetermined diameter and maintained at said diameter while the piece of dough is shaped into a bagel ring. Pursuant to a highly novel aspect of the present invention, the piercing is effected by a cone-shaped element to which the piece of dough is carried by an array of spreadable fingers. The fingers move the dough piece against the point of the cone and up the sides of the latter, the fingers spreading apart to accommodate the conical configuration. The conical configuration spreads the pierced aperture in the dough piece, the outer diameter of the dough piece also increasing as the latter is moved up the cone by the fingers. During said upward movement, the dough piece begins to roll upwardly on the conical surface and begins to assume the characteristic bagel shape. These operations are performed automatically by the machine of the present invention.

Referring now to the drawings in detail, the machine embodying the present invention comprises a rigid frame or housing 10 which mounts a feed or transfer device 12 and a bagel-forming or shaping device 14. The feed device advances a piece of bagel dough B1 (FIG. 7) to the shaping device 14 where it is pierced and centrally apertured to form a piece of bagel dough B2 (FIG. 6) having a central aperture of predetermined diameter. The shaping device 14 then shapes the apertured piece B2, by rolling, into a bagel ring B3 (FIGS. 6 and 7).

The transfer device 12 is mounted by a bracket or support 16 suitably mounted by the housing 10. Device 12 comprises a pneumatic motive means 18 which is secured to the bottom of the support. Pneumatic means 18, as here shown, is constituted by a conventional air cylinder 20 which is provided with a piston 22 having a piston rod 24 which extends upwardly from the cylinder and which is provided with a piston head 25. It will be understood that the pneumatic means 18 is of the double-acting type wherein the piston may be advanced and retracted by air pressure. The piston rod mounts a plurality or array of transfer or spreadable feed fingers 26, which collectively define the finger means 27. More specifically, provision is made for a finger mount 28 (FIGS. 6 and 7) which is carried by the rod 22, the mount extending into a seat 30 in the retracted position of the fingers. The seat 30 is mounted at the upper end of support 16.

Finger mount 28 is provided with a plurality of projections 32 to which the fingers are pivotally secured, as at 34. Finger mount 28 is substantially circular in cross-section so that the projections 32 and the fingers 26 are in circular relation, as best shown in FIGS. 3 and 8, with the vertical side edges of the fingers in abutting relation when the fingers are in closed condition, as shown in FIGS. 3 and 6. It will be noted that the fingers have outer arcuate surfaces 29. A circular or toroidal spring 36 encompasses the fingers and resiliently retains them in closed condition. Each finger is provided, at the upper side thereof, with an enlarged downwardly tapering rolling surface 38 (FIG. 8) which, in the open condition of the fingers, extends outwardly of the mount 28. Surfaces 38 cooperate to define a holding, rolling and pressure-applying or transfer surface for the finger means 27, when moving the dough piece B1 upwardly, as hereinafter described.

As here shown, the bagel-shaping device 14 is mounted in frame 10 above the bagel dough feed device 12. More specifically, the frame mounts a plate 15 provided with depending brackets 40 which mount a hollow cylinder or tube 42 spaced below plate 15. Plate 15 also mounts a tubular piercing member 44 which extends through the tube and projects beyond the bottom of the tube. The projecting end of the piercing member is provided with a narrow projecting tip 46 and with a circularly tapered, funnel-shaped or conical portion 48 which extends from the tip upwardly to the tubular body of member 44, as best seen in FIGS. 6 and 7. Four endless belts 50, formed of a suitable flexible material, extend through tube 42. More specifically, each belt is provided on its inner surface with teeth 52 centrally of the width-wise dimension thereof. Each belt engages a pair of vertically spaced wheels 54 and 56, wheels 54 being provided with peripheral teeth 58 which engage the teeth of the associated belt. The lower wheels 56 are followers which are mounted on shafts 62 journalled in brackets 64 provided at the lower end of tube 42. The upper wheels 54 are drive wheels which are mounted on shafts 66 journalled in brackets 68 provided at the upper end of tube 42. Each shaft 66 mounts a toothed pinion 70. Each pair of adjacent pinions 70 are engaged by an angle rack 72. More specifically, each rack has two sets of longitudinal marginal edge teeth 74 which mesh with the teeth of the adjacent pinion 70, as best seen in FIGS. 2 and 5.

Figure 5:
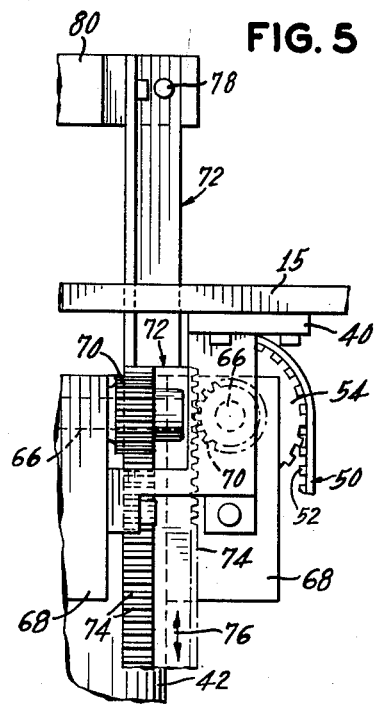
FIG. 5 is a fragmentary detail view, on an enlarged scale, looking in the direction of arrow 5 in FIG. 2.

Racks 72 are mounted for vertical reciprocation, as indicated by arrow 76 in FIG. 5. More specifically, the racks are mounted, as by bolts 78, on a movable plate 80, to which the upper ends of the racks are secured. Plate 80 is mounted on the piston rod 82 of the piston 84 of the pneumatic means 86. As here shown, pneumatic means 86 is constituted by a conventional air cylinder 88 which is provided with piston 84 having a piston head 90 within the air cylinder. It will be understood that the pneumatic means 86 is of the double-acting type wherein the piston may be advanced or retracted by air pressure. When the racks 72 move upwardly, as shown by arrow 89 in FIG. 6, the drive wheels 54—54 are rotated in the direction of arrows 90—92, respectively, so that the inner runs 94—94 of flexible belts 50—50 move upwardly. When the racks 72 move downwardly, as shown by arrows 96 in FIG. 7, the wheels 54 rotate in the opposite direction and drive the inner belt runs 94—94 downwardly. It will be noted from FIGS. 2 and 3 that the inner runs of the flexible belts are in the form of arcs which conform to the inner surface of tube 42.

Figure 9:
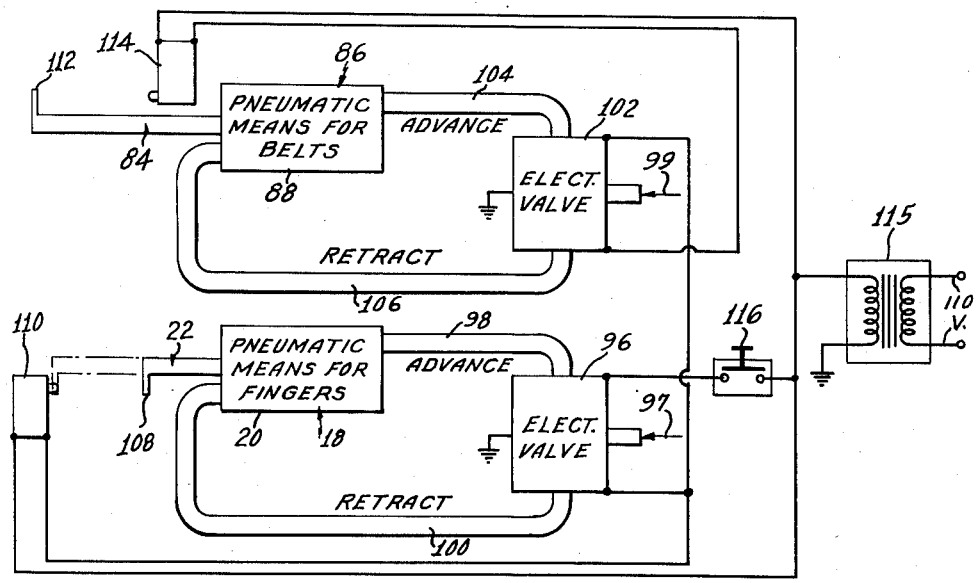
FIG. 9 is a more or less schematic diagram of the pneumatic system for operating the machine of the present invention.

Referring now to FIG. 9 in detail, there is shown a schematic diagram of the pneumatic system for operating both pneumatic motor means 18 and 86. A first electrically operated valve 96 controls the flow of air from a compressed air supply (as indicated by arrow 97) either through air line 98 or air line 100 to air cylinder 20 of pneumatic means 18. Air flow through line 98 causes piston 22 to advance outwardly of cylinder 20. Air flow through air line 100 causes piston 22 to be retracted into cylinder 20. A second electrically operated valve 102 controls the flow of air from the compressed air supply (as indicated by arrow 99) either through air line 104 or air line 106 to air cylinder 88 of pneumatic means 86. Air flow through line 104 causes piston 84 to advance outwardly of cylinder 88. Air flow through air line 106 causes piston 84 to be retracted into cylinder 88. It will be noted that piston 22 is provided with a finger 108 for operating micro-switch 110 when the piston is substantially fully advanced from cylinder 20. Piston 84 is provided with a finger 112 for operating switch 114 when the piston is substantially fully retracted into cylinder 88.

It will be understood that the operation of switch 110 by finger 108 causes valve 96 to operate from a condition in which air is supplied to conduit 98 to advance piston 22 to a condition in which air is suppled to conduit 100 to retract piston 22. Similarly, it will be understood that the operation of switch 114 by finger 112 causes valve 102 to operate from a condition in which air is supplied to conduit 106 to retract piston 84 to a condition in which air is supplied to conduit 104 to advance piston 84. The power for operating the valves is supplied from a suitable source of electricity through a transformer 115 and a switch 116.

FIG. 1 illustrates the apparatus of the present invention at the start of an operating cycle. A piece of bagel dough B1, of predetermined size, is placed on top of the closed fingers 26 of the feed or transfer device 12. It will be noted from FIG. 7 that the size of piece B1 is less than the space between the inner belt runs 94. When switch 116 is closed, valve 96 is energized so that air is supplied through conduit 98 to advance piston 22. As piston 22 advances, it carries the piece of dough B1 upwardly toward the pointed end 46 of the piercing member 44, as shown in FIG. 7. It will be noted that the conical portion 48 and point 46 extend below belts 50. The continuous advance of piston 22 causes the dough piece B1 to be pierced by the point 46 to form a central aperture which increases in diameter as the dough piece is moved by the fingers 26 up onto the conical portion 48 and onto the body of member 44. Such upward movement of the dough piece is facilitated by the opening or spreading of the fingers 26 as they ride up cone 48, as shown in FIG. 6. More specifically, as the dough piece B1 is moved up on cone 48, the dough piece begins to spread out and then first slides and then rolls up the cone. This upward rolling action, which begins to give the dough piece the characteristic bagel shape, and the outward spreading of the dough piece, is facilitated by the fact that cone 48 extends below the belts 50. The rolling action is also facilitated by the tapered finger surfaces 38. When the dough piece engages the belts, its outward expansion ceases and the rolling action is now accomplished by the belt movement as the dough piece is carried first up and then down tube 44. The fingers spreads to their maximum open positions when they ride over the cone, as shown in FIG. 8, with finger surfaces 38 supporting the dough piece. As piston 22 is moved upwardly to correspondingly cause the dough piece to move to a position where it engages the inner runs 94 of flexible belts 50, micro-switch 110 is actuated by finger 108. Such actuation of switch 110 is operative to cause the energization of valve 102 so as to supply air through conduit 106 and retract piston 84. Retraction of piston 84 causes an upward movement of the racks 72 so that gears 54 rotate as shown by arrows 90 and 92 in FIG. 6. This causes the smooth inner runs 94 of flexible belts 50 to move upwardly within tube 42, as shown by arrow 88. Consequently, as the dough piece B1 is moved upwardly into tube 42 by fingers 26 and passes onto the body portion of piercing member 44 to become the apertured dough piece B2, as shown in FIG. 6, it is engaged by the inner surfaces of belts 50 and rotated upwardly along member 44. Since the inner belt surfaces form substantially contiguous arcs, as shown in FIG. 3, the apertured dough piece B2 is fully formed into an annular or bagel-shape as it rides up member 44. The previously described actuation of switch 110 under the control of finger 108 also causes the energization of valve 96 so as to discontinue the supply of air through conduit 98 and to supply air through conduit 100, the latter causing a retraction of feed unit 12 toward its initial position shown in FIG. 1. When the bagel dough ring B3 has reached substantially to the top of tube 42, piston 84 has been retracted sufficiently to operate switch 114. This causes valve 102 to operate so as to discontinue the supply of air to conduit 106 and to supply air to conduit 104. This causes piston 84 to be advanced so as to move racks 72 downwardly. This reverses the rotation of gears 54 and causes belts 50 to reverse so that their inner runs move downwardly through tube 42, as shown by arrows 96. As the bagel ring B3 moves up into tube 42 it is rotated in the direction shown by arrows 118 and 120 in FIG. 6. When the bagel ring moves downwardly through tube 42, it rotates in the opposite direction, as shown by arrows 122 and 124 in FIG. 7. The switch 116 is opened when the bagel ring B3 is discharged from tube 42 where it may be received manually or by any suitable means. It will be apparent that the rotation of the bagel ring upwardly, and downwardly along member 44, will completely shape the latter into the well known bagel form.

It will be understood that due to the nature of the dough used in bagels, it is desirable to provide a Teflon coating to the surfaces of the machine which come into contact with the dough.

While we have shown and described the preferred embodiments of our invention, it will be understood that the invention may be embodied otherwise than as herein specifically illustrated or described, and that in the illustrated embodiment certain changes in the details of construction and in the form and arrangement of parts may be made without departing from the underlying idea or principles of this invention within the scope of the appended claims.

Having thus described our invention, what we claim and desire to secure by Letters Patent is:

1. In a machine for forming toroids of dough, an elongated member having a piercing tip at one end thereof, means to advance a discrete piece of dough onto and over said tip and onto said member to form an aperture in said dough piece and means to roll said apertured dough piece in a first direction and in an opposite direction longitudinally of said member.

2. In a machine for forming toroids of dough, an elongated member having a piercing tip at one end thereof, means to advance a discrete piece of dough onto and over said tip and onto said member to form an aperture in said dough piece, and means to roll said apertured dough piece in a first direction away from said tip and in a second direction toward said tip longitudinally of said member, said rolling means having provision to shape said apertured dough piece into a toroid.

3. In a machine for forming rings of dough, a tubular member of circular cross-section, a plurality of endless flexible belts looped through said member, the inner runs of said belts engaging the inner surface of said tubular member, an elongated member extending through said tubular member, said elongated member having a piercing end projecting from said tubular member for impaling a piece of dough thereon in engagement with said inner runs, and means for driving said belts to carry said impaled dough piece longitudinally of said member for shaping said dough piece into a ring, said elongated member having a portion adjacent to said piercing end for enlarging the diameter of the aperture formed in the dough piece by said piercing end, and a feed device movable relative to said piercing end for impaling a piece of dough thereon, said feed device having a plurality of fingers biased into closed condition and movable into open condition by engagement with said diameter-enlarging portion during transfer of the dough piece to said tubular member.

4. In a machine for forming rings of dough, a tubular member of circular cross-section, a plurality of endless flexible belts looped through said member, the inner runs of said belts engaging the inner surface of said tubular member, an elongated member extending through said tubular member, said elongated member having a piercing end projecting from said tubular member for impaling a piece of dough thereon in engagement with said inner runs, and means for driving the inner runs of said belts first away from and then toward said tip to carry said impaled dough piece in opposite directions longitudinally of said member for shaping said dough piece into a ring.

5. In a machine for forming rings of dough, a tubular member of circular cross-section, a plurality of endless flexible belts looped through said member, the inner runs of said belts engaging the inner surface of said tubular member, an elongated member extending through said tubular member, said elongated member having a piercing end projecting from said tubular member for impaling a piece of dough thereon in engagement with said inner runs, and means for driving the inner runs of said belts first away from and then toward said tip to carry said impaled dough piece in opposite directions longitudinally of said member for shaping said dough piece into a ring, and a feed device movable in opposite directions relative to said piercing end for impaling a discrete piece of dough thereon.

6. In a machine for forming rings of dough, a tubular member of circular cross-section, a plurality of endless flexible belts looped through said member, the inner runs of said belts engaging the inner surface of said tubular member, an elongated member extending through said tubular member, said elongated member having a piercing end projecting from said tubular member for impaling a piece of dough thereon in engagement with said inner runs, and means for moving the inner runs of said belts through a first predetermined movement upwardly of said member and through a second predetermined movement downwardly of said member to carry said impaled dough piece first longitudinally upwardly of said member and then longitudinally downwardly of said member for shaping said dough piece into a ring, and a feed device movable in opposite directions relative to said piercing end for impaling a piece of dough thereon, said belt moving means and said feed device each having a pneumatic motive means including reciprocable piston means, and means for operating said piston means in timed relation.

7. In a machine for forming rings of dough, a tubular member of circular cross-section, a plurality of endless flexible belts looped through said member, the inner runs of said belts engaging the inner surface of said tubular member, an elongated member extending through said tubular member, said elongated member having a piercing end projecting from said tubular member for impaling a piece of dough thereon in engagement with said inner runs, and means for moving the inner runs of said belts through a first predetermined movement upwardly of said member and through a second predetermined movement downwardly of said member to carry said impaled dough piece first longitudinally upwardly of said member and then longitudinally downwardly of said member for shaping said dough piece into a ring, and a feed device movable in opposite directions relative to said piercing end for impaling a piece of dough thereon, said belt moving means and said feed device each having a pneumatic motive means including reciprocable piston means, and means for operating said piston means in timed relation, said piston operating means including air-valve means operable in response to piston movement for advancing and retracting the associated piston.

8. In a machine for forming rings of dough, an elongated member having a conical end portion and a plurality of spreadable fingers operable to advance a piece of dough onto and upwardly over said conical end portion to form and enlarge an aperture in said dough piece, to increase the outer diameter of said dough piece and to roll the latter up said conical end portion.

9. A machine for forming a dough piece into a toroid, comprising an elongated member having an impaling tip, a cylindrical body portion and a conical portion between said tip and body portion, means for impaling a discrete dough piece on said tip to define an aperture therein and for advancing said impaled dough piece over said conical portion to enlarge said aperture, and means to roll said enlarged apertured dough piece along said body portion to form a toroid, said means to impale said dough piece and advance the latter over said conical portion comprising a plurality of spreadable fingers.

10. A machine as in claim 9, said fingers being arranged in circular disposition and means biasing said fingers toward said disposition thereof.

11. A machine as in claim 9, each finger having a downwardly tapering free end portion.

References Cited in the file of this patent

UNITED STATES PATENTS

| | | |
|---|---|---|
| 829,097 | Crabb | Aug. 21, 1906 |
| 1,105,647 | Greaves | Aug. 4, 1914 |
| 1,871,837 | Brown | Aug. 16, 1932 |
| 1,940,564 | Schilling | Dec. 19, 1933 |
| 2,584,514 | Thompson et al. | Feb. 5, 1952 |
| 2,611,329 | Lehman | Sept. 23, 1952 |
| 2,625,119 | Jennings | Jan. 13, 1953 |
| 2,779,298 | Chwirat et al. | Jan. 29, 1957 |

FOREIGN PATENTS

| | | |
|---|---|---|
| 285,188 | Great Britain | Feb. 16, 1928 |